United States Patent [19]
Moore et al.

[11] Patent Number: 6,166,766
[45] Date of Patent: Dec. 26, 2000

[54] SENSING CIRCUIT FOR CAPTURING A PIXEL SIGNAL

[75] Inventors: Kendall G. Moore, Tempe; Frederic B. Shapiro, Phoenix; Deborah J. Beckwith, Chandler; Michael W. Hodel, Mesa, all of Ariz.

[73] Assignee: Motorola, Inc., Schaumburg, Ill.

[21] Appl. No.: 08/929,125

[22] Filed: Sep. 3, 1997

[51] Int. Cl.[7] .................................................. H04N 5/217
[52] U.S. Cl. ........................................... 348/241; 327/90
[58] Field of Search .................................... 348/207, 241, 348/243, 248, 249, 250, 311, 312, 294, 300; 327/91, 94, 96, 90, 310; 341/122, 123, 124, 125; H04N 5/217

[56] References Cited

U.S. PATENT DOCUMENTS

| | | |
|---|---|---|
| 4,574,250 | 3/1986 | Senderowicz . |
| 4,862,121 | 8/1989 | Hochschild et al. . |
| 5,039,950 | 8/1991 | McDermott . |
| 5,086,344 | 2/1992 | D'Luna et al. . |
| 5,159,341 | 10/1992 | McCartney et al. . |
| 5,323,158 | 6/1994 | Ferguson, Jr. . |
| 5,355,396 | 10/1994 | Tai . |
| 5,448,606 | 9/1995 | Snelgrove . |
| 5,574,457 | 11/1996 | Garrity et al. . |
| 5,736,886 | 4/1998 | Mangelsdorf et al. .................. 327/310 |
| 5,892,540 | 4/1999 | Kozlowski et al. ..................... 348/300 |
| 5,963,156 | 10/1999 | Lewicki et al. .......................... 341/122 |
| 6,025,875 | 2/2000 | Vu et al. .................................. 348/241 |

*Primary Examiner*—Tuan Ho
*Attorney, Agent, or Firm*—Eugene A. Parsons; Lanny L. Parker

[57] ABSTRACT

A sensing circuit (202) uses correlated double sampling to sample a first pixel signal of a pixel stream ($V_{PIXEL}$) at two different times to produce a dark signal and a light signal on two capacitors (310, 314). The dark and light signals are amplified in an amplifier (302) to produce a differential output signal ($V_{PP}$–$V_{PN}$) proportional to their difference. While the samples of the first pixel signal are being amplified, a second pixel signal is double-sampled to produce dark and light signals on two other capacitors (312, 316) for amplifying in the same amplifier. The period of the pixel signal is divided into time slots ($T_1$–$T_{16}$) by a clocked oscillator (52). Programming signals (PROG1, PROG2) control the time slots in which sampling control pulses ($V_{S1}$, $V_{S2}$) are generated.

6 Claims, 4 Drawing Sheets

SENSING CIRCUIT FOR CAPTURING A PIXEL SIGNAL

BACKGROUND OF THE INVENTION

The present invention relates in general to integrated circuits and, more particularly, to a circuit for processing an image signal generated by a photoactive device.

High-resolution image capturing systems typically sense images with an array of semiconductor photoactive sensing devices such as charge-coupled devices, photodiodes and optotransistors. Such arrays are compact and operate at low power and therefore are ideal for use in portable equipment such as digital cameras and scanners. The photoactive sensing devices generate output signals representative of pixels of an image projected on the array. The image is projected through color filters or equivalent structures so that each photoactive device responds to one of the primary colors of light. The color-filtered pixel signals are combined to reproduce the colors of the image. For example, in an RGB system, each photoactive device is responsive to either red, green or blue light.

Pixel signals are sensed in a serial fashion to form an analog pixel stream at an output of the sensing array. To ensure compatibility with high definition television standards, the pixel stream is sensed and processed at a pixel rate of at least 27.0 megahertz. To reduce sensing noise, the pixel stream is sensed only during specific time slots. The best noise control for a given range of processing parameters and operating conditions is achieved when the time slots have equal widths.

Prior art systems achieve high pixel rates by sensing alternate pixels of the video stream in alternate sense amplifiers. For example, odd numbered pixels are sensed in a first sense amplifier, even numbered pixels are sensed in a second sense amplifier, and the resulting output signals of the alternate sense amplifiers are multiplexed into a single stream for further processing. A desired time slot for sensing the pixel signal is selected by comparing a programming code with a time slot count generated by a high frequency binary counter. The clock driving the binary counter operates at a frequency equal to the product of the sampling rate and the number of time slots per pixel signal period. For example, where the pixel signal operates at 27.0 megahertz and sixteen time slots are desired within the pixel signal, a clock operating at 27*16=432 megahertz is required.

A problem with prior art sensing schemes is that any mismatch between the alternate sense amplifiers results in fixed pattern display defects which are difficult or impossible to identify or correct. Moreover, the high frequency binary counter consumes a large amount of power.

Hence, there is a need for an improved sensing circuit which reduces fixed pattern display defects and which reduces power by generating sampling pulses at a lower clock frequency.

DETAILED DESCRIPTION OF THE DRAWINGS

Figure 1:
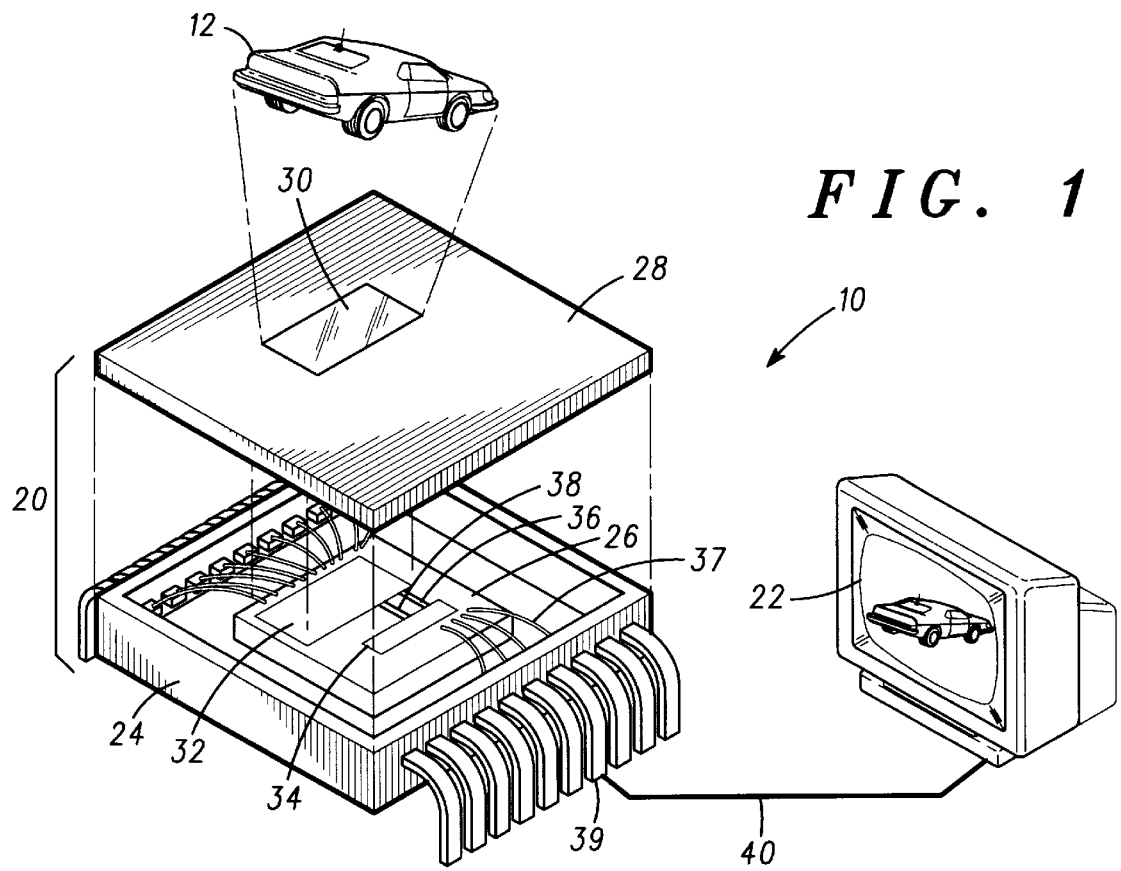
FIG. 1 is an isometric view of an image capturing system.

FIG. 1 is a partially exploded isometric view of an image capturing system 10 including an image capture device 20 and an output device 22. Image capturing system 10 captures an image 12 for converting to digital data in a format recognizable by output device 22, as is described in further detail below.

Image capture device 20 includes a package 24 housing an imaging integrated circuit 26 and a lid 28 for enclosing integrated circuit 26 within package 24. Lid 28 includes a transparent portion 30 to project image 12 onto a region 32 of integrated circuit 26. The transparent portion can be fabricated to operate as a focusing lens or, in the alternative, focusing can be accomplished with an external lens (not shown) interposed between image 12 and region 32. Region 32 includes an optical sensing array organized as a matrix of photoactive semiconductor devices such as charge-coupled devices, photodiodes and optotransistors functioning as pixel sensors. Each photoactive device produces a pixel signal whose voltage is correlated to the intensity and color of light on the device. Region 32 further includes circuitry for selecting pixels in a predefined order to produce a stream of pixel signals on a conductor 36.

Integrated circuit 26 includes a region 34 containing a signal processing circuit which processes the analog pixel stream to produce digital output data which is coupled through wire bond 37 to a lead 39 of package 24. Although the output signal is represented in FIG. 1 as being provided on a single lead to simplify the figure, in many applications the output data is provided on a bus to a multiplicity of leads of package 20. Control signals such as clock and address signals are provided on a conductor or bus 38 by circuitry in region 34 for controlling the electrical operation of the sensing array of region 32.

Output device 22 is shown as being a monitor, but can be any number of devices such as a printer, a storage device such as a disk drive, and the like. In a wireless communications device such as a pager or portable telephone, image capturing system 10 provides a modulation signal to broadcast the image to another communications device. Hence, output device 22 can include a radio frequency oscillator to provide a carrier signal, a modulator for modulating the carrier signal with the output data and an antenna for transmitting the modulated carrier signal.

Figure 2:
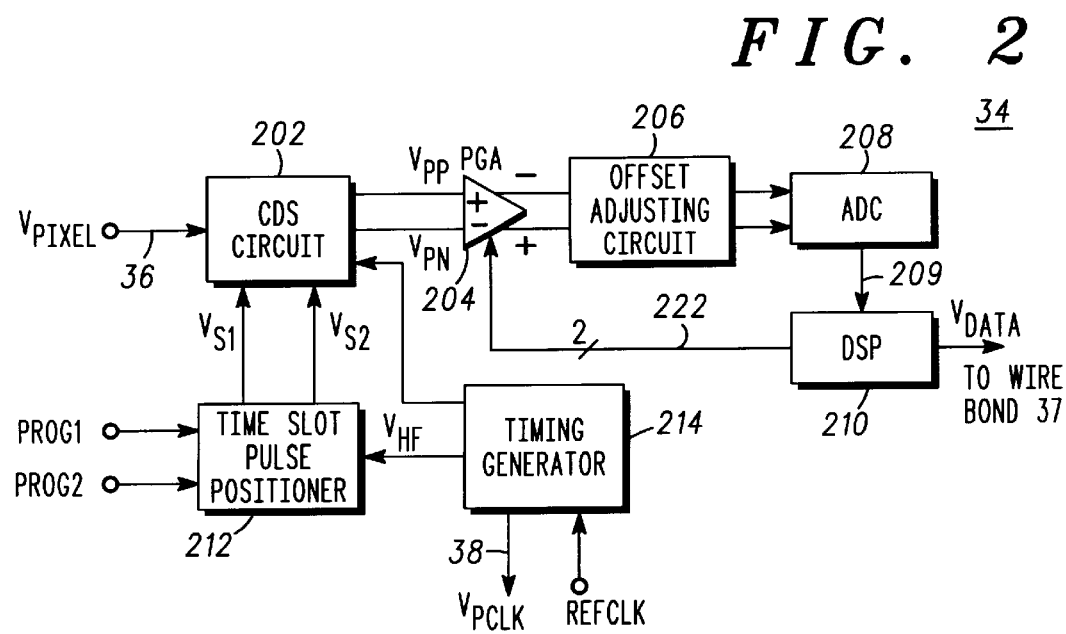
FIG. 2 is a block diagram of the signal processing circuitry.

FIG. 2 is a block diagram of the signal processing circuit of region 34. In the figures, elements having the same reference numbers provide similar functions. An analog pixel stream $V_{PIXEL}$ operating at a 27.0 megahertz pixel rate is received on conductor 36. $V_{PIXEL}$ includes pixel signals whose amplitudes indicate the amount of light projected onto corresponding photoactive devices in the optical sensing array. In a color system, the light to each device typically passes through a color filter such that the pixel signal represents a primary color component.

A correlated double sampling (CDS) circuit 202 is a sensing circuit which samples $V_{PIXEL}$ at particular time points described in detail below. $V_{PIXEL}$ is a single-ended signal which, to increase noise immunity and dynamic range, is converted by CDS circuit 202 to a differential output signal $V_{PP}$–$V_{PN}$ representative of light intensity. Hence, CDS circuit 202 operates as a single-ended to differential converter. CDS circuit 202 typically includes a voltage gain stage to optimize the dynamic range for a given type of photoactive device in the optical sensing array. For example, most photoactive devices produce pixel signals whose amplitude under maximum light conditions is approximately one volt. In an embodiment for use in a portable wireless communications device operating from a battery power supply voltage $V_{DD}$=2.8 volts minimum, CDS circuit 202 provides a voltage gain of approximately 1.5 to provide a peak-to-peak dynamic range of 1.5 volts.

A timing generator 214 receives a reference clock signal REFCLK from an external source for synchronizing operations of image capturing system 10. Timing generator 214 includes a frequency synthesizer which controls a voltage controlled oscillator (VCO) to provide a high frequency clock signal $V_{HF}$ operating at 27*8=216.0 megahertz. $V_{HF}$ clocks a time slot pulse positioner 212 for dividing a period of $V_{PIXEL}$ into time slots during which CDS circuit 202 samples $V_{PIXEL}$. A pixel clock signal $V_{PCLK}$ operating at 27.0 megahertz is derived by frequency dividing $V_{HF}$ or by using a second VCO referenced to REFCLK. $V_{PCLK}$ is provided on conductor 38 for addressing the photoactive devices to set the rate of $V_{PIXEL}$.

Time slot pulse positioner 212 receives $V_{HF}$ from timing generator 214 and generates sensing clocks $V_{S1}$ and $V_{S2}$ within a selected time slot which are used by CDS circuit 202 to sample $V_{PIXEL}$, as described below.

Output signal $V_{PP}$–$V_{PN}$ is applied to differential inputs of a programmable gain amplifier (PGA) 204. PGA 204 is a digitally programmable gain stage whose gain is controlled by data indicative of a primary color and provided on a two-conductor bus 222. In order to capture the true colors of image 12, the primary color components of $V_{PIXEL}$ must have equal amplitudes when the light intensity of each primary color is equal. That is, when white light is projected onto region 32, the red, green and blue filtered devices should produce pixel signals of the same amplitude. In practical systems, however, photoactive devices have different responses to light of different colors. In addition, color filters provide different degrees of transparency, so that for a given light intensity different colors produce unequal amplitudes of pixel signals.

To provide a white balance adjustment for $V_{PIXEL}$, the gain of PGA 204 is varied according to the color sensed by each pixel signal in $V_{PIXEL}$. For example, red pixel signals may be amplified by a gain of 1.0, while green pixel signals are amplified by a gain of 1.333 and blue pixel signals are amplified by a gain of 2.0. When white light is projected on the optical sensing array, the resulting color-dependent pixel signals are adjusted in amplitude such that digital output signal $V_{DATA}$ is displayed as white light.

An offset adjusting circuit 206 receives a white balanced differential output signal from PGA 204 and corrects for voltage offsets introduced by the photoactive devices and by CDS circuit 202 and PGA 204. The offset is produced by quiescent carrier generation in the photoactive devices as well as offsets from imperfect component matching in CDS circuit 202 and PGA 204. The offset is determined by measuring the output signal of offset adjusting circuit 206 under zero light conditions using techniques that are well established in the art.

Analog to digital converter (ADC) 208 receives the offset adjusted signal at a differential input to produce a representative parallel digital word on bus 209. A high data rate is achieved by configuring bus 209 to have at least as many conductors as there are bits in the digital word produced by ADC 208. For example, if the digital word is eight bits wide, bus 209 includes eight conductors, etc.

Digital signal processing circuit (DSP) 210 receives the parallel digital words from ADC 208 and performs any of a variety of operations, such as gamma correction, image noise filtering, pixel cluster averaging, color deepening and contrast enhancement, data compression and output data formatting. DSP 210 also controls a color lookup table (not shown) to optimize mixtures of red, green and blue pixels for displaying images on specific printers or monitors. Software instructions for operating DSP 210 are stored in a memory device such as read-only or random access memory.

Figure 3:
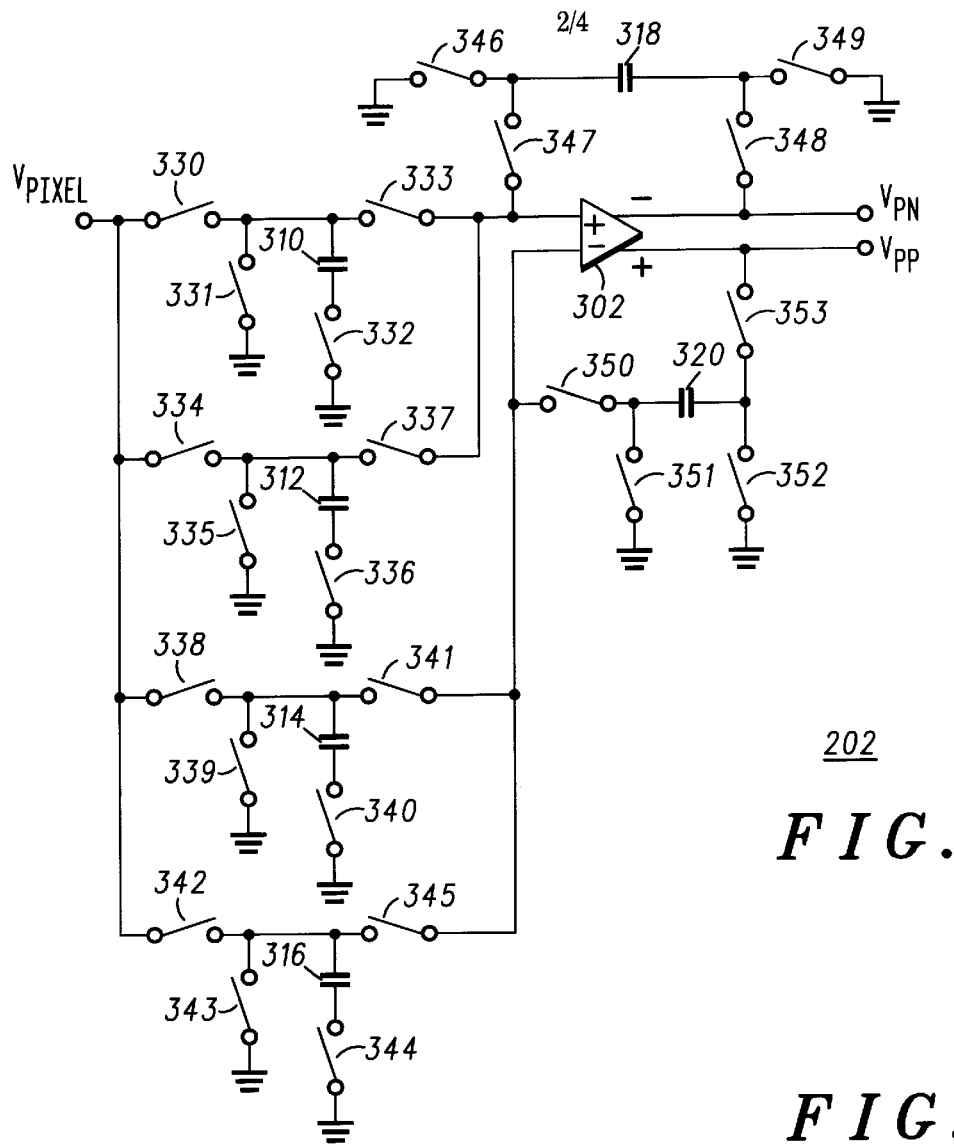
FIG. 3 is a schematic diagram of a correlated double sampling circuit.

FIG. 3 is a schematic diagram of CDS circuit 202 including an amplifier 302 and capacitors 310–320. CDS circuit 202 further includes switches 330–353 implemented as transmission gates or similar analog switching devices which can transfer analog signals with minimal distortion. CDS circuit 202 performs a sample-and-hold function as well as a subtracting function which senses the magnitude of $V_{PIXEL}$ at first and second time points and subtracts the samples to produce differential output signal $V_{PN}$–$V_{PP}$. Amplifier 302 often includes a voltage gain stage to maximize dynamic range. For example, in one embodiment where the maximum amplitude of $V_{PIXEL}$ is 1.0 volts, CDS circuit 202 produces a gain of 1.5.

Typically, high gain CDS amplifiers have long settling times and slow speeds in comparison to the period of $V_{PIXEL}$. To increase the rate of sensing, prior art systems use parallel amplifiers to sample alternate pixel signals so that one amplifier can be settling while the other amplifier is sensing a pixel signal. However, such parallel sensing amplifiers distort the displayed image and produce fixed pattern defects. The sensing circuit of the present invention overcomes this problem by sampling alternate pixel signals with alternate capacitors and processing the samples through a single amplifier 302 rather than through multiple sense amplifiers to take advantage of the fact that capacitors can be matched more accurately than amplifiers in an integrated circuit. By using only one amplifier to sense pixel signals, the present invention further improves on the prior art by reducing power consumption and die area.

Figure 4:
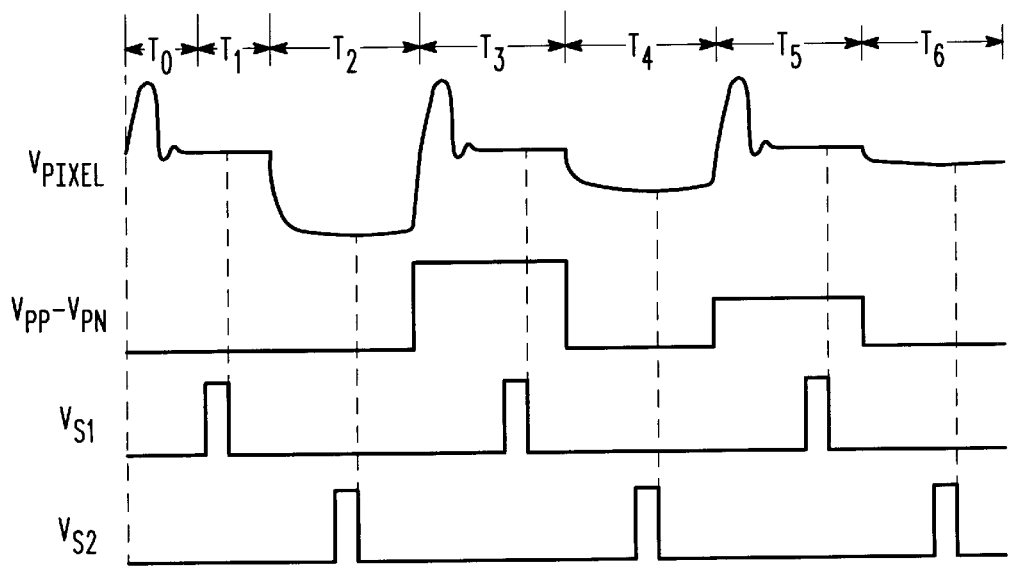
FIG. 4 is a timing diagram of signals of a correlated double sampling circuit.

The detailed operation of CDS circuit 202 is seen by referring to the timing diagram of FIG. 4, which shows a typical waveform of pixel stream $V_{PIXEL}$ including three consecutive pixel signals generated by three successively accessed photoactive devices in the optical sensing array. The first pixel signal includes time periods $T_0$, $T_1$, and $T_2$; the second includes time periods $T_3$ and $T_4$; and the third includes time periods $T_5$ and $T_6$.

Time period $T_0$ is characterized by high switching noise generated when discharging parasitic capacitances in the optical sensing array when accessing a photoactive device. Switching noise is correlated noise, i.e., noise that recurs during each pixel signal.

Time period $T_1$ is referred to as the dark or reference period during which $V_{PIXEL}$ contains primarily low frequency noise but no information regarding light intensity. Both correlated and uncorrelated noise can be present but typically have low amplitudes. The level of $V_{PIXEL}$ during time period $T_1$ is used as a reference to filter out the low frequency noise. A programmable sampling signal $V_{S1}$ controls when $V_{PIXEL}$ is sampled during the dark period to produce a dark or reference signal.

Time period $T_2$ is designated as the light period during which the amplitude of $V_{PIXEL}$ is indicative of light projected onto a photoactive sensing device. A programmable sampling signal $V_{S2}$ controls when $V_{PIXEL}$ is sampled during the light period. The second and third pixel signals have features similar to those of the first pixel signal, and can be characterized in terms of time periods comparable to periods $T_0$–$T_2$ of the first pixel signal. That is, time periods $T_0$ and $T_1$ correspond to $T_3$ of the second pixel signal and $T_5$ of the third pixel signal, while time period $T_2$ corresponds to $T_4$ and $T_6$.

Referring back to FIG. 3, the first pixel signal is sampled during time period $T_0$ or $T_1$ by closing switches 330 and 332 and opening the other switches while $V_{S1}$ is logic high to charge capacitor 310 to the dark or reference level of the first pixel signal. The first pixel signal is further sampled during the light period (time period $T_2$) by closing switches 338 and 340 and opening the other switches while $V_{S2}$ is logic high. Switches 333 and 341 are closed and the other switches open during time periods $T_2$ and $T_3$ to store the sampled dark and light levels at the non-inverting and inverting inputs, respectively, of amplifier 302. During time period $T_3$, amplifier 302 operates in the subtract/amplify mode in which switches 347, 348, 350 and 353 are closed to produce differential analog output signal $V_{PP}$–$V_{PN}$ proportional to the difference between the sampled dark and light levels.

While the amplified first pixel is being output during $T_3$ the second pixel signal is similarly being sampled, once during $T_3$ by closing switches 334 and 336 while $V_{S2}$ is logic high to charge capacitor 312 to establish a reference level of the second pixel signal, and again during $T_4$ by closing switches 342 and 344 while $V_{S2}$ is logic high. Switches 337 and 345 are closed during time periods $T_4$ and $T_5$ to store the sampled dark and light levels at the inputs of amplifier 302. During $T_5$, amplifier 302 operates in the subtract/amplify mode by closing switches 347, 348, 350 and 353 to produce $V_{PP}$–$V_{PN}$ in proportion to the difference between dark and light levels of the second pixel signal.

When amplifier 302 is not operating in the subtract/amplify mode, switches 346, 349, 351, and 352 are closed to remove the charge on capacitors 318 and 320. Similarly, switches 331, 332, 339 and 340 are closed during $T_4$ to discharge capacitors 310 and 314, while switches 335, 336, 343 and 344 are closed during $T_6$ to discharge capacitors 312 and 316.

Hence, $V_{PIXEL}$ is sensed as described above by alternately sampling and storing dark and light levels of odd pixel signals on capacitors 310 and 314 and dark and light levels of even pixel signals on capacitors 312 and 316. These samples are all routed through amplifier 302 to provide a single signal path through amplifier 302 for all pixel signals of $V_{PIXEL}$. The parallel amplifier paths used in the prior art are thereby avoided, which improves the quality of the displayed image. It is evident that the above described sensing scheme can be extended to higher $V_{PIXEL}$ rates by using additional capacitor pairs to successively sample the dark and light levels of additional pixel signals on each cycle.

Figure 5:
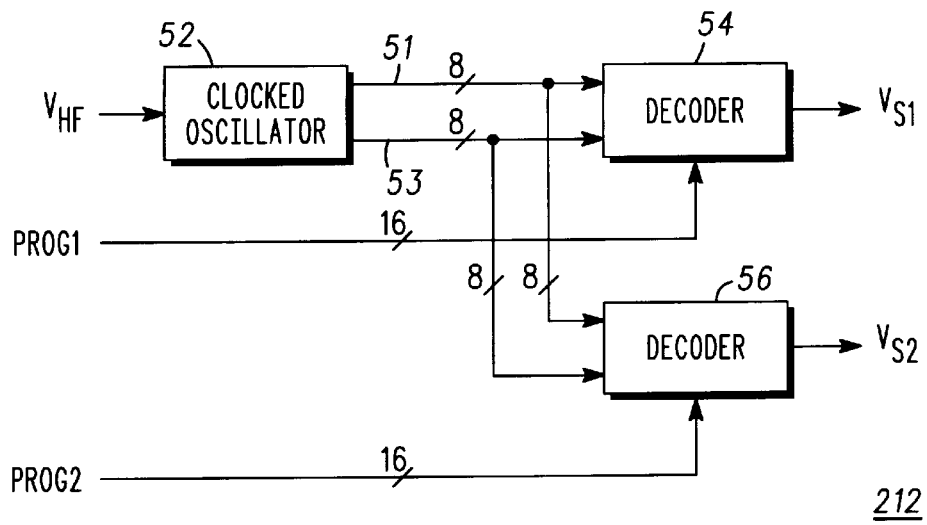
FIG. 5 is a schematic diagram of time slot pulse positioner.

FIG. 5 is a schematic diagram of time slot pulse positioner 212, including a clocked oscillator 52 and decoders 54 and 56. Clocked oscillator 52 is configured as a nine stage clocked ring oscillator which is clocked on both the rising and falling edges of complementary clocks to produce eight bits of data on buses 51 and 53 to represent sixteen possible time slots $T_1$–$T_{16}$ for sampling $V_{PIXEL}$. The nine stage clocked ring oscillator includes eight clocked inverters synchronized to $V_{HF}$ and one standard ripple through inverter. The outputs of the eight clocked inverters drive differential amplifiers to provide true and complementary output signals on buses 51 and 53, respectively. The true and complementary outputs of each clocked inverter have coincident edges to allow for $V_{S1}$ and $V_{S2}$ pulses which are easily expanded to more than one time slot without generating noise from transition glitches.

Prior art counters increment on one edge of a clock signal and therefore require sixteen clock pulses to produce a count of sixteen. The present invention has an advantage of clocking on both the rising and falling edges of clock signal $V_{HF}$ so that only eight pulses are needed to produce a count of sixteen. Hence, $V_{HF}$ can operate at one-half the frequency of prior art systems while providing similar functionality at lower power. In particular, where $V_{PIXEL}$ operates at 27.0 megahertz, $V_{HF}$ runs at 8*27=216 megahertz, whereas prior art time slot clocks of comparable performance need to operate at 16*27=432 megahertz.

Figure 6:
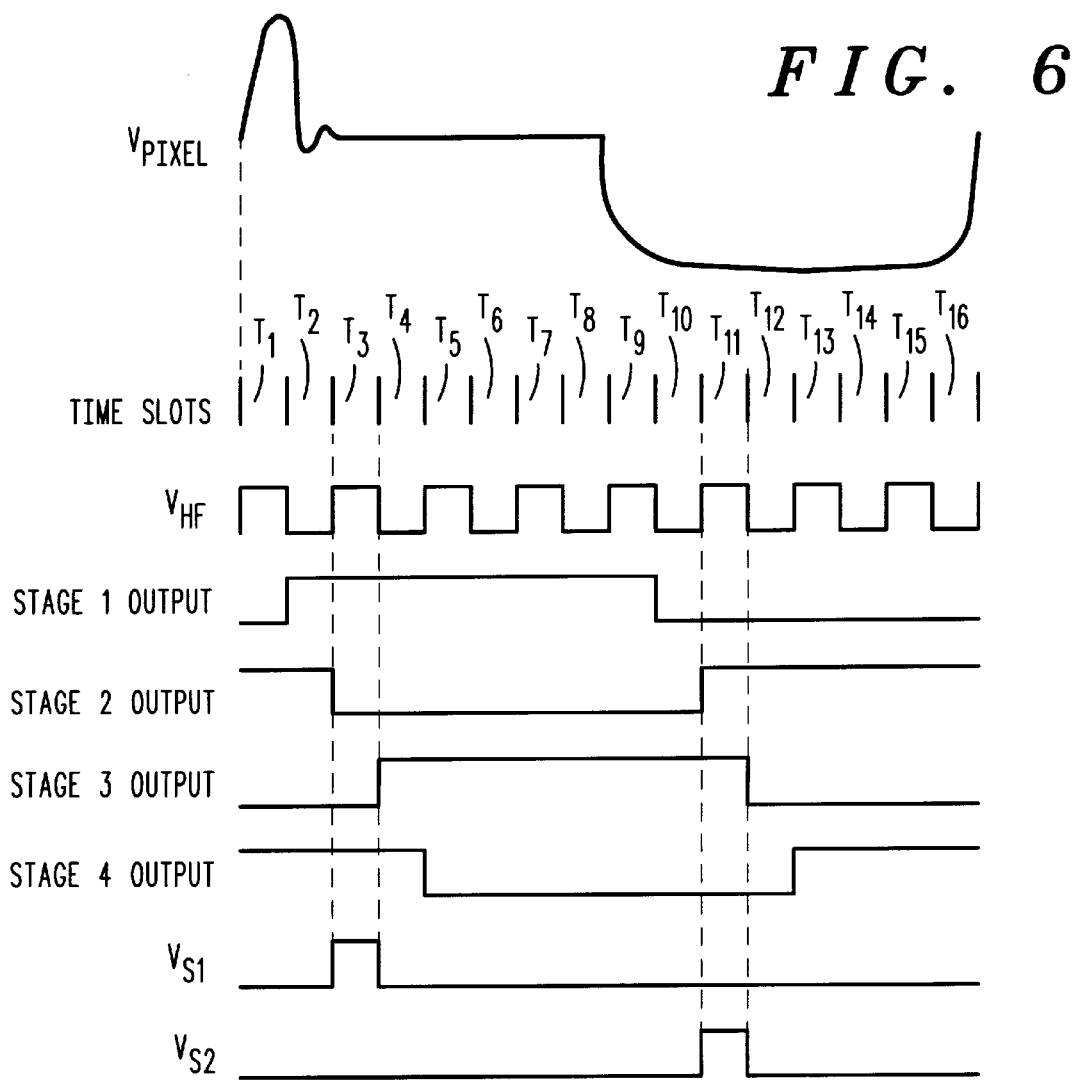
FIG. 6 is a timing diagram of the time slot pulse positioner.

Operation of time slot pulse positioner 212 is seen by referring to the timing diagram of FIG. 6, showing a period of $V_{PIXEL}$ divided into time slots $T_1$–$T_{16}$ representing the possible times for generating sampling signals $V_{S1}$ and $V_{S2}$. Note that each time slot is defined by successive transition edges of $V_{HF}$ so that sixteen time slots are generated with only eight cycles of $V_{HF}$.

Decoder 54 receives eight true output signals from the eight clocked inverters on eight-bit bus 51 and eight complementary output signals on eight-bit bus 53. The true output signals from successive pairs of inverters are decoded through a single two-input AND logic gate (not shown) or the equivalent to produce eight internal pulses of decoder 54, or one pulse during each of the time slots $T_2$, $T_4$, $T_6$, $T_8$, $T_{10}$, $T_{12}$, $T_{14}$, and $T_{16}$. Similarly, the complementary output signals from consecutive pairs of clocked inverters are decoded to produce internal pulses during each of the eight time slots $T_1$, $T_3$, $T_5$, $T_7$, $T_9$, $T_{11}$, $T_{13}$, and $T_{15}$.

A programming word PROG1 is provided on a sixteen conductor bus to an input of decoder 54 to set the time slot in which $V_{S1}$ is generated. Each bit of PROG1 controls a switch between a two-input AND logic gate and the output of decoder 54 to select an internal pulse for switching to the output of decoder 54 to produce $V_{S1}$ during a programmed time slot. For example, assume that a particular two-input AND logic gate performs an AND operation on the complementary output signals of successive clocked inverters of clocked oscillator 52 designated as STAGE 2 and STAGE 3 as shown in FIG. 6. The bit of PROG1 which controls the switch between the AND logic gate and the output causes $V_{S1}$ to be generated during time slot $T_3$, as shown in FIG. 6.

By decoding consecutive stages of clocked oscillator 52 in pairs through a single logic gate, decoder 54 operates at higher speed than prior art decoders. Heavily loaded nodes are avoided, which reduces propagation delay. In addition, $V_{S1}$ and $V_{S2}$ have shorter rise and fall times which allows decoder 54 to produce narrower and more accurate $V_{S1}$ pulses and to increase the number of possible time slots if desired. The short rise and fall times have an additional advantage of allowing PROG1 to activate more than one switch of decoder 54 to couple successive internal pulses to the output to produce a pulse of $V_{S1}$ that spans more than one time slot.

Decoder 56 operates similarly, receiving a sixteen bit programming word PROG2 to control the time slot during which $V_{S2}$ is generated. As an example, suppose that a given AND logic gate in decoder 56 performs an AND operation on the true output signals of clocked inverters designated as STAGE 2 and STAGE 3. The bit of PROG2 which controls the switch between the given AND logic gate and the output causes $V_{S2}$ to be generated during time slot $T_{11}$, as shown in FIG. 6.

Figure 7:
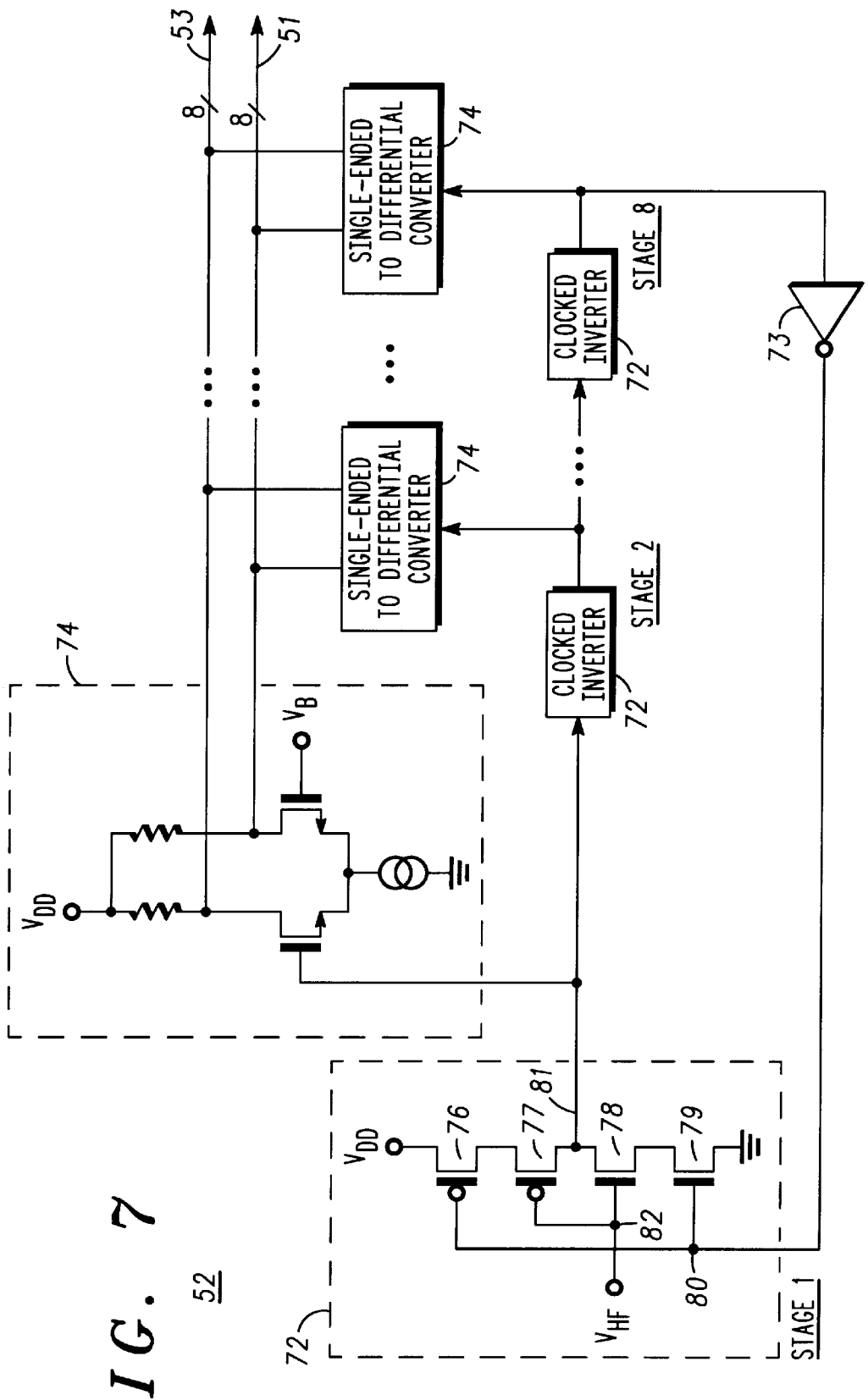
FIG. 7 is a schematic diagram of a clocked oscillator.

FIG. 7 is a schematic diagram showing further detail of clocked oscillator 52 for dividing a period of $V_{PIXEL}$ into time slots, including eight clocked inverters 72 configured as a ring oscillator whose stages are designated as STAGE 1 through STAGE 8 as shown. Because a ring oscillator requires an odd number of inversions to provide the negative feedback needed to sustain oscillation, a standard ripple through inverter 73 or its equivalent is included to provide a ninth inversion. The number of time slots within a period can be changed by providing a corresponding number of clocked inverter stages in clocked oscillator 52.

Each clocked inverter 72 produces an output signal at an output 81 and receives an input signal from the previous stage at an input 80. Input 80 is coupled to the control or gate electrodes of a p-channel metal-oxide-semiconductor (PMOS) transistor 76, an n-channel metal-oxide-semiconductor (NMOS) transistor 79 and the output of the previous stage. An input 82 is coupled to PMOS transistor 77 and NMOS transistor 78 for receiving $V_{HF}$. After a transition at input 80, the output signal remains in its current state until the next transition to synchronize the output signals of each stage to $V_{HF}$.

Operation of clocked oscillator 52 is seen by referring to the timing diagram of FIG. 6. Waveforms at the outputs (node 81) of the first four clocked inverters 72, referred to as STAGE 1 through STAGE 4, are shown to illustrate the operation of the circuit. When an output of a stage changes its logic state, the output of the next stage changes state on the next transition of $V_{HF}$. Hence, for one-half cycle until the next $V_{HF}$ transition, or one time slot, consecutive stages have outputs at the same logic state. For example, the outputs of STAGE 1 and STAGE 2 are both high during time slot $T_2$ and low during time slot $T_{10}$. Similarly, the outputs of STAGE 2 and STAGE 3 are both low during time slot $T_3$ and high during time slot $T_{11}$, and the outputs of STAGE 3 and STAGE 4 are both high during time slot $T_4$ and low during time slot $T_{12}$.

Clocked oscillator 52 further includes eight single-ended to differential converters 74 whose input receives the output signal of a clocked inverter 72 for providing true and complementary output signals on buses 51 and 53, respectively, whose transition edges are coincident. The coincident edges and light loading of nodes of decoders 54 and 56 result in $V_{S1}$ and $V_{S2}$ pulses which are easily expanded to more than one time slot without transition glitches, which provides flexibility in sampling $V_{PIXEL}$ at time points which minimize noise in the displayed image.

In summary, the present invention provides a sensing circuit using correlated double sampling to sense a first pixel signal at different time slots to store a dark (or reference) signal and a light signal on two capacitors. The dark and light signals are amplified in an amplifier to produce a differential output signal proportional to their difference. While the dark and light samples from the first pixel signal are being amplified, a second pixel signal is being sampled to produce dark and light signals on two other capacitors. These dark and light signals are amplified in the same amplifier to produce a differential output signal indicative of the amplitude of the second pixel signal. By amplifying the alternately sampled pixel signals in the same amplifier, fixed pattern display artifacts due to mismatched amplifiers are reduced or eliminated. Noise is reduced by sampling the pixel signal during a programmed time slot generated by a clocked oscillator. The clock signal for the clocked oscillator operates at twice the period of a time slot, which allows operation at a lower frequency and reduced power.

What is claimed is:

1. An image capturing circuit, comprising:

a photoactive device responsive to light from an image for producing a pixel signal at a terminal;

a signal processing circuit, including
   (1) an amplifier having first and second inputs and first and second outputs;
   (2) first, second, third, fourth, fifth and sixth capacitors, the first capacitor being coupled between the first input and the first output and the second capacitor being coupled between the second input and the second output of the amplifier; and
   (3) a switching circuit for switching a signal generated by the photoactive device to an electrode of the third capacitor during a first time period and to an electrode of the fifth capacitor during a second period, the switching circuit coupling the electrodes of the third and fifth capacitors to the first and second inputs of the amplifier during a third time period to produce a first value of a sense signal across the first and second outputs of the amplifier, the switching circuit further switching the signal to an electrode of the fourth capacitor during the third time period and to an electrode of the sixth capacitor during a fourth time period, the switching circuit coupling the terminals of the fourth and sixth capacitors to the first and second inputs of the amplifier to produce a second value of the sense signal.

2. The image capturing circuit of claim 1, wherein the signal processing circuit further includes a clocked oscillator responsive to a clock signal for generating a plurality of time periods used in the switching circuit.

3. A sensing circuit, comprising:

first, second, third, fourth, fifth and sixth capacitors;

an amplifier having first and second inputs and first and second outputs for providing an output signal, the first capacitor being coupled between the first input and the first output and the second capacitor being coupled between the second input and the second output;

a switching circuit responsive for switching a pixel signal to a terminal of the third capacitor during a first sampling time and to a terminal of the fifth capacitor during a second sampling time, the switching circuit coupling the terminals of the third and fifth capacitors to the first and second inputs of the amplifier to produce a first value of the output signal, the switching circuit further responsive for switching the pixel signal to a terminal of the fourth capacitor during a third sampling time and to a terminal of the sixth capacitor during a fourth sampling time, the switching circuit coupling the terminals of the fourth and sixth capacitors to the first and second inputs of the amplifier to produce a second value of the output signal.

4. The sensing circuit claim 3, wherein the first and second capacitors are equal in capacitance and the third and fourth capacitors are equal in capacitance.

5. The sensing circuit of claim 4, further comprising a photoactive device that operates in response to light for producing the pixel signal.

6. The sensing circuit of claim 3, wherein the the first value of the output signal is representative of a difference between the pixel signal having a reference value and a sensed pixel value.

* * * * *